United States Patent [19]

Mizuno et al.

[11] Patent Number: 4,532,432
[45] Date of Patent: Jul. 30, 1985

[54] CONTROL CIRCUIT SYSTEM FOR AUTOMOBILES

[75] Inventors: Yoshikazu Mizuno, Aichi; Akira Ikuma, Kariya, both of Japan

[73] Assignee: Nippondenso Co., Ltd., Kariya, Japan

[21] Appl. No.: 380,252

[22] Filed: May 20, 1982

[30] Foreign Application Priority Data

May 22, 1981 [JP] Japan ................... 56-77679
Nov. 12, 1981 [JP] Japan ................... 56-181591

[51] Int. Cl.³ .......................... H02G 3/00; H02J 1/00; H01H 9/00
[52] U.S. Cl. .................. 307/10 R; 307/115; 200/61.54; 340/22
[58] Field of Search ............... 340/22; 307/10 R, 115; 200/61.54

[56] References Cited

U.S. PATENT DOCUMENTS 4,028,620 6/1977 Kitagawa et al. ............. 307/10 R
4,340,824 7/1982 Shaw ........................ 307/10 R
4,386,279 5/1983 Yoshimi .................... 307/10 R
4,453,088 6/1984 Moore ....................... 307/10 R

FOREIGN PATENT DOCUMENTS 52-41527 10/1977 Japan .

Primary Examiner—James J. Groody
Attorney, Agent, or Firm—Cushman, Darby & Cushman

[57] ABSTRACT

A control circuit system for an automobile comprises a plurality of command switches (including an electric horn switch) all provided on a steering wheel. A control circuit is provided to generate a control signal in response to each command signal from the switches, and a signal coupling element is provided to connect the switches and the control circuit through a single signal line conventionally used for the electric horn switch. Operation of the automobile horn is enabled through a normally-closed relay even when a power switch connecting the automobile battery and the control circuit is open, thereby eliminating continuous drain on the automobile battery by a dormant but powered control circuit.

7 Claims, 5 Drawing Figures

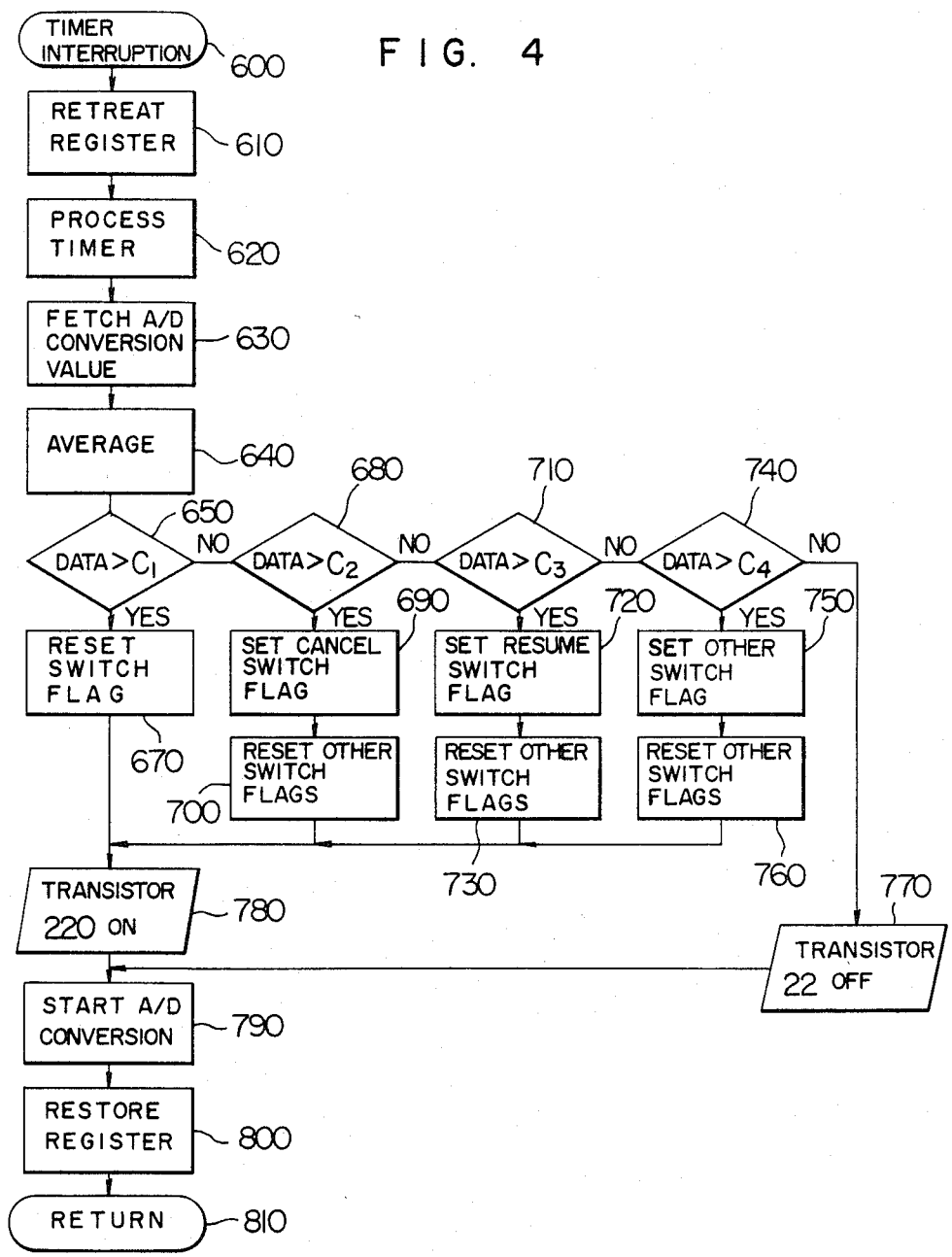

CONTROL CIRCUIT SYSTEM FOR AUTOMOBILES

The present invention relates to a control circuit system for automobiles including a plurality of switches such as a horn switch provided on the steering handle.

An attempt has so far been made to mount on the steering handle of an automobile the switches operated while the automobile is running, in order to meet the requirement of safety by operating the switches without the hands leaving the handle or while keeping the driving posture and the requirement to prevent an erroneous operation by confirming the driving operations without turning eyes away.

Since the steering handle of the automobile is already provided with a horn switch, however, installation of the operating switches on the handle requires a signal line for such operating switches in addition to the signal line for the horn switch. In view of the fact that the steering handle is adapted to make several revolutions freely as well known, a new slip ring is required for adding a new signal line.

If a specific one of the switches is assigned for the horn switch, only a single signal line is sufficient, but it is necessary to supply power always to a signal voltage discrimination circuit, thereby adversely affecting the service life of the automotive battery.

In the case where the horn or a horn relay is used for a discrimination impedance element, on the other hand, it is difficult to discriminate other switch signals without operating the horn, thus resulting in a lower reliability.

The present invention has been made in view of the above-mentioned disadvantage, and an object thereof is to provide a control circuit system comprising a plurality of command switches including a horn switch mounted on the steering handle, a control circuit for generating a control signal in response to a command signal from the command switches, a normally-closed relay switch interposed between the command switches and the electric horn and controlled by an output signal of the control circuit, and a signal coupler circuit for connecting the command switches and the control circuit by a single common line.

Other objects, features and advantages of this invention will be readily apparent from the following description taken in conjunction with the accompanying drawings, in which:

FIG. 4 is a diagram showing a flow chart of timer interruption of the control system shown in FIG. 2.

Figure 1:
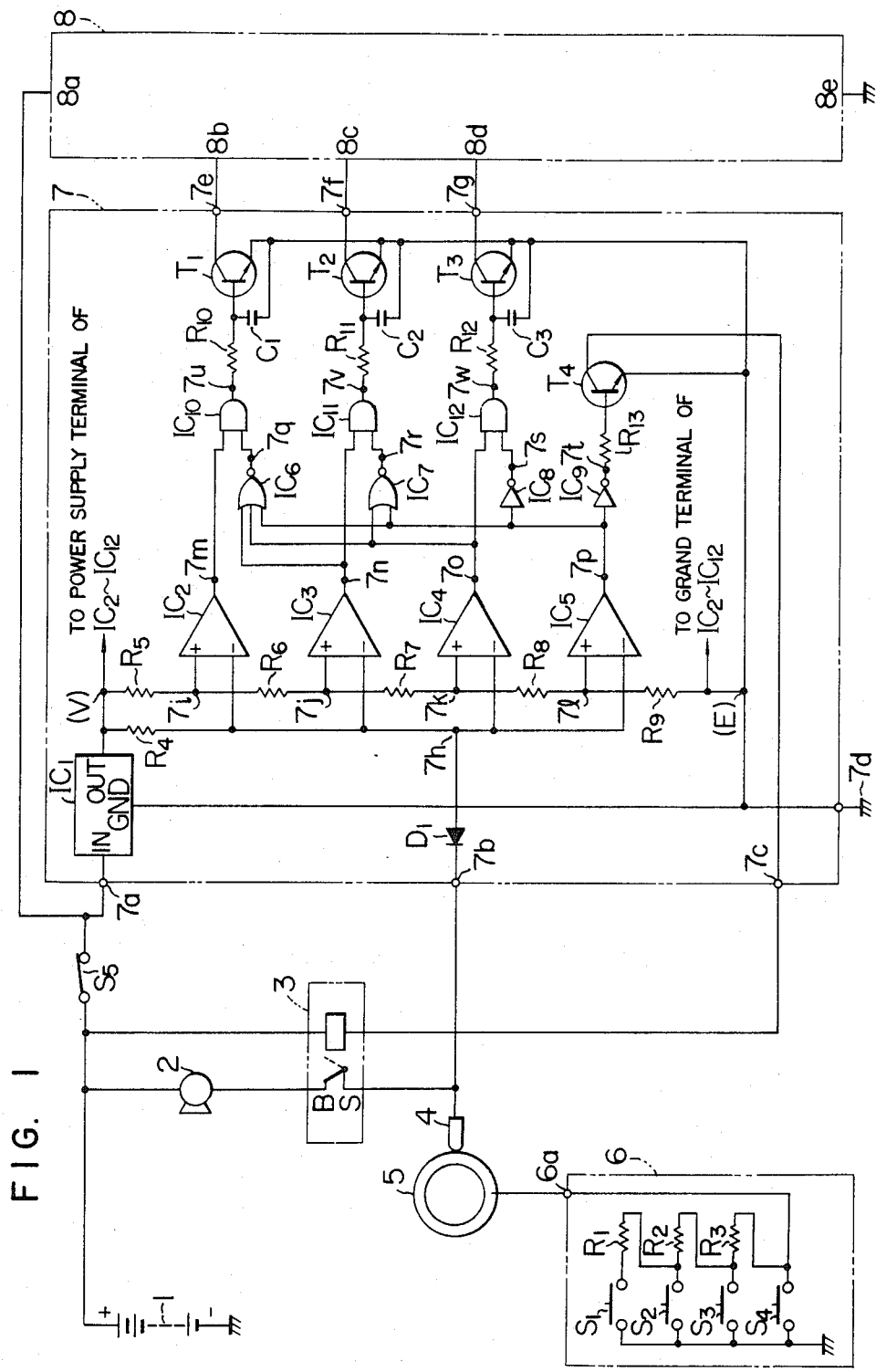
FIG. 1 is an electrical circuit diagram showing a first embodiment of the control circuit system according to the present invention.

In FIG. 1, reference numeral 1 designates a battery mounted on an automobile, and numeral 2 electric horn with an end thereof connected to the positive terminal of the battery 1 and the other end thereof connected to the end B of a normally-closed contact of a relay 3. The horn 2 includes therein a normally-open control relay and sounds in response to the energization of the control relay. The normally-closed relay 3 thus controls the drive current of the control relay for the horn 2. The drive coil of the relay 3 having a normally-closed contact has an end thereof connected to the positive terminal of the battery 1, and the other end thereof connected to the terminal 7c of a control circuit 7. The other end S of the normally-closed contact is connected to the terminal 7b of the control circuit 7 and the contact 4 thereby to form a signal line. The contact 4 is of lever type fixed on the side of the body and in contact with the steering handle, the leading end of the contact 3 being in contact with a slip ring 5 which is also kept in electrical contact by the rotation of the handle. Further, the slip ring 5 is connected to the signal line 6a of switches 6 including switches S1, S2, S3 and S4, with an end of each thereof grounded. The other end of the switch S1 is connected to an end of the resistor R1; the other end of the switch S2 is connected to the other end of the resistor R1 and an end of the resistor R2; the other end of the switch S3 is connected to the other end of the resistor R2 and an end of the resistor R3; and the other end of the switch S4 is connected to the other end of the resistor R3 and through the terminal 6a to the slip ring 5.

The switch S5 makes up a power switch for the control circuit 7 and a load 8.

The control circuit 7 includes integrated circuits IC1 to IC14, resistors R4 to R13, capacitors C1 to C3, transistors T1 to T4 and a diode D1. The terminal 7a is connected through the power switch S5 to the positive terminal of the battery 1. The terminal 7d is grounded while the terminals 7e, 7f and 7d are connected to the terminals 8b, 8c and 8d of the load respectively.

The semiconductor integrated circuit IC1 makes up what is called a three-terminal series regulator which generates a stabilized voltage (5 V) by applying a voltage (12 V) between a common terminal GND and an input terminal IN.

The integrated circuits IC2, IC3, IC4 and IC5 are generally-known voltage comparators. The power terminals of the integrated circuits IC2 to IC5 are connected to the power line V and the grounding terminals thereof to the grounding line E.

The integrated circuits IC6, IC7, IC8, IC9, IC10, IC11 and IC12 are logic elements; IC6 is three-input NOR circuit; IC7 a two-input NOR circuit; IC8 and IC9 are inverters; and IC10, IC11, IC12 are AND elements. The power terminals of the integrated circuits IC6 to IC12 are connected to the power line V and the grounding terminals thereof connected to the grounding line E.

The power input terminal 7a of the control circuit 7 is connected to the input IN of the regulator IC1, and the output OUT supplies power to the power line V. The signal input terminal 7b is connected to the cathode of the diode D1. The anode of the diode D1 is connected to an end of the resistor R4 and each one input of the voltage comparators IC2 to IC4. The other end of the resistor R4 is connected to the power line V.

The resistors R5 to R9 are connected to each other to divide the potential of the power line V and the grounding lines. The contact between the resistors R5 and R6 is connected to the positive terminal of the voltage comparator IC2; the contact between the resistors R6 and R7 is connected to the positive terminal of the voltage comparator IC3; the contact between the resistors R7 and R8 is connected to the positive terminal of the voltage comparator IC4; and the contact between the resistors R8 and R9 is connected to the positive terminal of the voltage comparator IC5.

The output of the voltage comparator IC2 is connected to the input terminal of the logic circuit IC10. The output terminal of the voltage comparator IC10 is connected to an end of the resistor R10, and the other end thereof is connected to the base of the transistor T1 and an end of the capacitor C1. The other end of the capacitor C1 and the emitter of the transistor T1 are connected to a grounding line. The collector of the transistor T1 is connected through the output terminal 7e to the load 8b.

The output of the voltage comparator IC3 is connected to the input of the logic circuits IC6 and IC11. The output of the logic circuit IC11 is connected to an end of the resistor R11, and the other end of the resistor R11 is connected to the base of the transistor T2 and an end of the capacitor C2. The other end of the capacitor C2 and the emitter of the transistor T2 are grounded. The collector of the transistor T2 is connected through the terminal 7f to the load 8c.

The output of the voltage comparator IC4 is connected to the input of the logic circuits IC6, IC7 and IC12, and the output of the logic circuit IC12 is connected to an end of the resistor R12. The other end of the resistor R12 is connected to the base of the transistor T3 and an end of the capacitor C3. The other end of the capacitor C3 and the emitter of the transistor T3 are connected to the grounding line E. The collector of the transistor T3 is connected through the terminal 7g to the terminal of the load 8d.

The output terminal of the voltage comparator IC5 is connected with the inputs of the logic circuits IC6, IC7, IC8 and IC9, and the output of the logic circuit IC9 is connected to an end of the resistor R13. The other end of the resistor R13 is connected to the base of the transistor T4, the emitter of which is connected to the grounding line E. The collector of the transistor T4 is connected through the terminal 7c to an end of the coil terminal of the relay 3 having a normally-closed contact.

The output terminal of the logic circuit IC6 is connected to the input terminal of the logic circuit IC10. The output terminal of the logic circuit IC7 is connected to the input terminal of the logic circuit IC11. The output terminal of the logic circuit IC8 is connected to the input terminal of the logic circuit IC12.

The values of the resistors R1 to R9 are determined in such a manner that the potential of the terminal 7h is $7j<7h<7i$ when the switch S1 is depressed, $7k<7h<7j$ when the switch S2 is depressed, $7l<7h<7k$ when the switch S3 is depressed, and $7h<7l$ when the switch S4 is depressed. Also, the impedance of the resistors R1 to R3 are determined sufficiently high as compared with the impedance of the horn 2.

Now, the operation of the first embodiment of the system according to the present invention will be explained. Assuming that the switch S5 is turned off, the control circuit 7 is not supplied with power, and therefore the transistors, T1 to T4 remain turned off. Since the relay 3 is not driven, the contact thereof remains closed. When the switches S1 to S4 are all turned off, the horn is not supplied with any current and therefore the horn 2 is not actuated. Under this condition, the signal line is at substantially the potential of the battery, and therefore reverse current is blocked by the diode D1 at the input terminal of the control circuit. In the case where any one of the switches S1 to S3 is turned on, on the other hand, the resistance value of the resistors R1 to R3 is high as compared with that of the horn 2 as mentioned above, and therefore the horn 2 is not actuated. When the switch S4 is turned on, by contrast, the horn 2 is actuated through the relay 3, the contact 4, the slip ring 5 and the switch S4. In this way, when the power supply of the control circuit is cut off, the switch S4 is operated normally as a horn switch, and the horn 2 is not erroneously actuated by other switches.

Now, assume that the switch S5 is turned on, that is, the power supply for the control circuit is turned on. If the switches S1 to S4 are all turned off, the signal input line 7b is substantially at the same potential as the battery voltage, and therefore the anode potential of the diode D1 is reduced to the same level as the power line V by the resistor R4, so that the outputs of all the voltage comparators IC2 to IC5 are at low level. Since the logic circuits IC10, IC11, IC12 are at low level, the transistors T1, T2, T3 are turned off respectively. At the base of the transistor T4, on the other hand, the "0" level is reversed by the logic circuit IC9 and therefore current is supplied to the base of the transistor T4 through the resistor R13, so that the transistor T4 is turned on, the relay 3 is driven and the horn 2 is separated from the signal line. Since the potential of the terminal 7h remains unchanged, however, the horn 2 is kept separated from the signal line.

Now, assume that the power switch S5 of the control circuit 7 is turned on and the handle switch S1 alone is turned on. By the current flowing through the resistor R4, the diode D1 and the resistors R3, R2 and R1, the potential at the terminal 7h is placed between the levels of terminals 7j and 7i, so that the output of the voltage comparator IC2 is raised to high level, while the outputs of the voltage comparators IC3 to IC5 are reduced to low level. Under this condition, as mentioned above, the transistors T2 and T3 remain off, and the transistor T4 remains on, while the inputs of the logic circuit IC6 are at low level and the output thereof is raised to high level. As a result, the inputs of the logic circuit IC10 are at high level, so that the transistor T1 is turned on (after the time constant due to the resistor R10 and the capacitor C1), thus producing a signal at the terminal 8b of the load 8.

When the handle switch S1 is released, the handle switches S1 to S4 are all turned off, so that the signal ceases to be applied to the load 8.

In the case where only the handle switch S2 is turned on, the potential of the terminal 7h is placed between those of the terminal 7k and the terminal 7j, so that the outputs of the voltage comparators IC2 and IC3 are raised to high level and the outputs of the voltage comparators IC4 and IC5 are reduced to low level. Under this condition, one of the input terminals of the logic circuit IC6 is at high level, and therefore the output terminal of the logic circuit IC6 is reduced to low level. The output of the logic circuit IC10 is also reduced to low level, thus keeping the transistor T1 off. Since the inputs of the logic circuit IC7 are at low level, the output thereof is at high level, so that the input terminals of the logic circuit 11 are at high level. The output terminal of the logic circuit IC11 is also raised to high level, and the transistor T2 is turned on and applies a signal to the terminal 8c of the load 8. When the handle switch S2 is turned off, the control circuit is supplied with power, so that the transistor T2 is turned off and no signal is produced therefrom.

Now, assume that the power switch S5 of the control circuit 7 is turned on, and the handle switch S3 alone is turned on. The potential at the terminal 7h is placed between those of the terminals 7l and 7k as described above, and therefore the outputs of the voltage comparators IC2, IC3 and IC5 are at high level, while the output of the voltage comparator IC5 is at low level. The transistor T4 is thus kept on. An end each of the inputs of the logic circuits IC6 and IC7 is raised to high level, while the outputs of the logic circuits IC6 and IC7 are reduced to low level. Therefore, an end each of the logic circuits IC10 and IC11 is at low level, so that the outputs thereof are also at low level, with the result that the transistors T1 and T2 are turned off. Since the input of the logic circuit IC8 is at low level, the output thereof is at high level. The inputs of the logic circuit IC12 are at high level, and the output thereof is also at high level, so that the transistor T3 is turned on and a signal is applied to the input terminal 8d of the load 8. When the handle switch S3 is turned off, the power supply for the control circuit 7 is turned on, and thus the signal is not applied to the load 8.

Now, assume that the power switch S5 for the control circuit 7 is turned on and the handle switch S4 is also turned on. The potential at the terminal 7h is lower than that at the terminal 7l, and therefore all the outputs of the voltage comparators IC2 to IC5 are raised to high level. The outputs of the logic circuits IC6, IC7, IC8 and IC9 are all at low level, so that the transistors T1 to T4 are turned off in a manner similar to the preceding case. The relay 3 having a normally-closed contact fails to be supplied with the drive current, so that the horn 2 is actuated with the current supplied thereto through the relay 3, the contact 4, the slip ring 5 and the switch S4. Since the switch S4 is turned on, however, the potential at the terminal 7h is lower than that at the terminal 7l, so that the outputs of the voltage comparators remain the same as in the preceding case, and the horn continues to be actuated. When the switch S4 is turned off, power supply is restored so that the relay 3 is energized by the transistor T4 and the contact of the relay 3 opens, thus stopping the horn 2.

Assume that the power switch S5 for the control circuit is turned on and the switch S2 is turned on. The potential at the terminal 7h successively crosses the potentials at the terminals 7i and 7j from the source potential V. The capacitor C1 is thus effective for the base of the transistor T1 for preventing the transistor T1 from being turned on instantaneously. This is also the case with the capacitors C2 and C3.

Further, in the case where the power switch S5 for the control circuit is turned on and a plurality of switches are turned on, the switches are evidently ranked in priority as S4>S3>S2>S1.

Assume that the load 8 is a steady speed running device, the switch S1 is an acceleration switch (the vehicle is accelerated while this switch is on, and runs at steady speed obtained at the time of turning it off), the switch S2 is a restoration switch (if this switch is turned on after cancelling the steady speed running, the condition before cancellation is restored), and the switch S3 is a deceleration switch (the vehicle is decelerated while this switch is on, and runs at a steady speed obtained by turning it off). Even if two switches are operated by error, a danger is avoided without any acceleration. In this embodiment, the voltage comparators and the logic circuits are made up of semiconductor integrated circuits, which may be replaced with equal effect by diodes or the like. Also in the above-described embodiment, the input voltage of the voltage comparators is stabilized by use of regulator. This stabilization function may be eliminated within the range of variations of battery voltage.

Further, the four switches used in the embodiment may be increased or decreased in number.

Furthermore, the resistors R1, R2, R3 making up the switches may be replaced by diodes or the like. What is more, instead of the steady speed running device, the load may take the form of a direction indicator, lamp control, or wiper control or any combination thereof. Also, according to the present embodiment, a control circuit is provided separate from a load circuit. This configuration may be replaced by another configuration in which the control circuit is incorporated in the load circuit or vice versa.

According to the present invention, the switches are mounted on the steering handle, so that the driver is capable of driving the vehicle accurately without deforming his correct driving posture or without turning his eyes away, thereby leading to an improved operability and safety.

Figure 2:
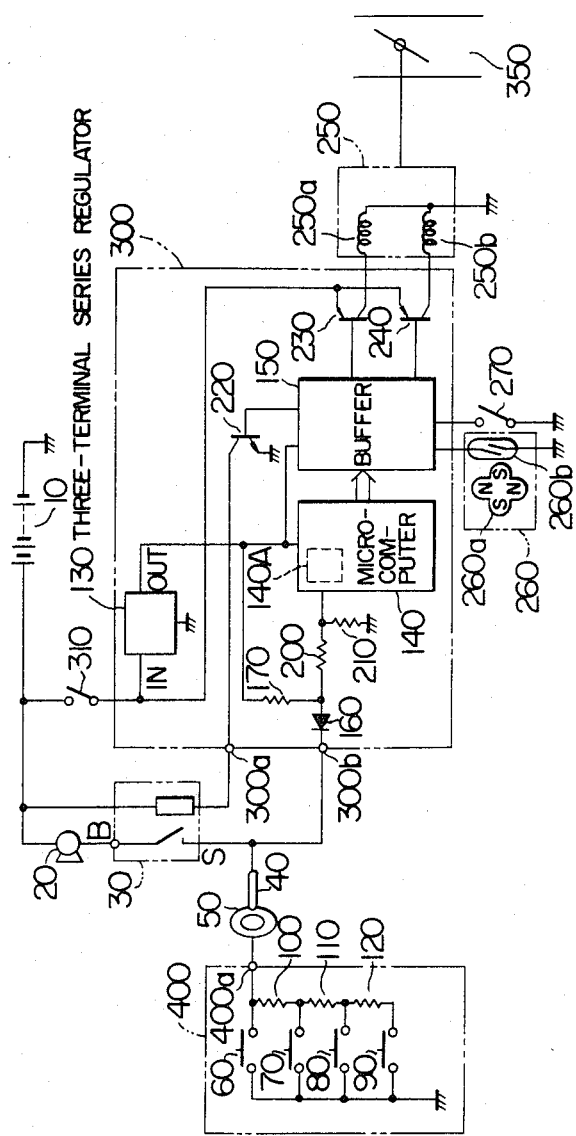
FIG. 2 is an electrical circuit diagram showing a second embodiment of the control circuit system according to the present invention.

A second embodiment of the present invention will be described below. In FIG. 2, reference numeral 10 designates an automotive battery, and numeral 20 a horn an end of which is connected to the positive terminal of the battery 10 and the other thereof to a terminal B of the normally-closed contact of the relay 30. An end of the drive coil of the relay 30 having a normally-closed contact is connected to the positive terminal of the battery 10, and the other end thereof is connected to the terminal 300a of the control circuit 300. The other terminal S of the normally-closed contact is connected to the contact 40 and the terminal 300b of the control circuit 300 thereby to form a signal line. The contact 40 is of lever type fixed to the body and has a forward end in contact with the slip ring 50 which maintains electrical contact also by rotation of the handle. Further, the slip ring 50 is connected to the signal line 400a of the switches 400.

The switches 400 include a set switch 70 for ordering the start of the fixed or steady speed running, a resume switch 80 for restoring a target speed as before the cancellation and starting the fixed speed running after cancellation of the fixed speed running, a cancellation switch 90 for cancellation of the fixed speed running and a horn switch 60, each of which has an end thereof grounded. The other end of the switch 90 is connected to an end of the resistor 120, and the other end of the switch 80 is connected to the other end of the resistor 120 and an end of the resistor 110. The other end of the switch 70 is connected to the other end of the resistor 110 and an end of the resistor 100. The other end of the switch 60 is connected to the other end of the resistor 100 and to the slip ring 50 via the terminal 400a. The switch 310 is a power switch for the control circuit 300.

The control circuit 300 contains therein a microcomputer 140 having an analog-digital conversion function 140A, an internal timer interruption function and an external interruption function. In response to an instruction from the microcomputer 140, the control unit 300 turns on the transistors 230 and 240 and gives a cancellation command, a control command or the like to a throttle actuator 250 through a buffer 150. This throttle valve actuator 250 is operatively coupled with a throttle valve 350 making up a speed regulating element and includes a control valve 250a for regulating the internal pressure and a cancellation valve 250b.

Further, the control unit 300 is supplied with vehicle speed data from a vehicle speed detector system 260 including a rotating member 260a having four magnetic poles rotated by a meter cable corresponding to the rotation of the vehicle wheels and a reed switch 260b adapted to be closed each time of approach thereto of any of the magnetic poles, four pulse signals being produced for each revolution of the rotating member 260a or meter cable. When the vehicle is running at the speed of 60 km/h, for instance, the meter cable makes 637 rpm.

The switch 270 is comprised of a logic sum including a brake signal and a clutch signal for cancellation of the fixed speed running. These signals are applied to the microcomputer 140 through the buffer 150. Numeral 130 designates what is called a three-terminal series regulator for generating a stabilized voltage (5 V) at the output terminal OUT by applying a voltage (12 V) between the common terminal GND and the input terminal IN. The collector terminal of the transistor 220 is connected to an end of the coil of the normally-closed contact relay 30. The transistor 220 is normally turned on thereby to turn off the contact of the relay 30, thus separating the horn from the signal line. Thus the signal from the switches 400, namely, the voltage of the input terminal 300b is determined by the resistance value of the discrimination impedance 170 and the resistance value of the switches 400. This input voltage signal is divided by the resistors 200 and 210 through the diode 160, connected to the analog input terminal of the microcomputer, and converted from an analog quantity to a digital quantity in the microcomputer. The diode 160 is for blocking the current flow into the control circuit which otherwise might be caused by the fact that when the power switch 310 is turned off, the contact of the normally-closed contact 30 is turned on so that the potential of the signal line reaches substantially the same level as the positive terminal of the battery 10. The resistors 200 and 210 are for dividing the input signal level into an input voltage range of the microcomputer.

As explained above, the signal voltage level is applied to the microcomputer 140, and in accordance with the digital quantity thereof, which of the switches 400 is depressed is determined. When the power switch 310 is turned off, the transistor 220 is turned off and the contact of the relay 30 is closed, so that the horn switch 60 is turned on thereby to sound the horn. When the horn switch 60 is turned on with the power switch 310 on, the signal level thereof is determined by the microcomputer 140 as explained above, so that the transistor 220 is turned off through the buffer 150 and the contact of the relay 30 is closed thereby to sound the horn.

Figure 3:
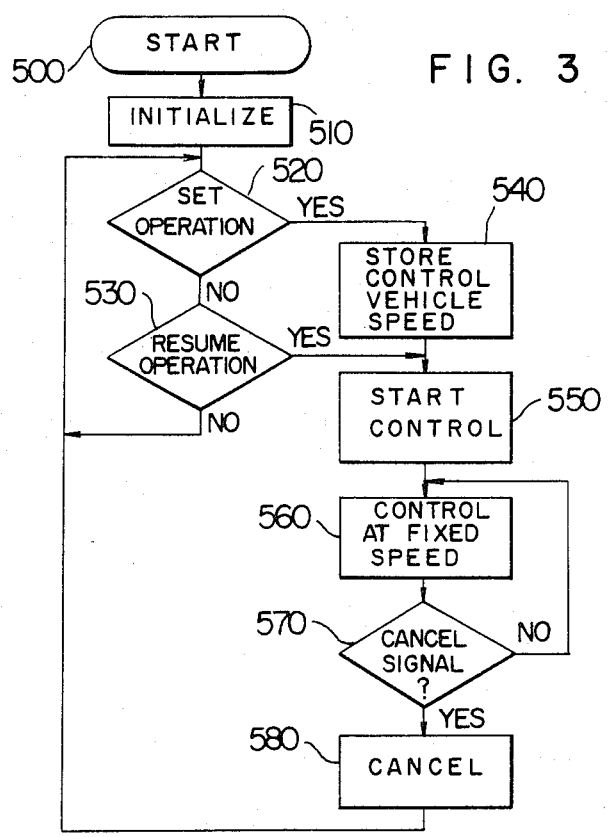
FIG. 3 is a diagram showing the main flow of the operation of the control circuit system of FIG. 2.

The operation after power is supplied to the control unit 300 through the main switch 310 will be described with reference to FIGS. 3 and 4. As soon as power is supplied to the control unit 300, the microcomputer 140 therein executes the initialization routine of step 510. The transistor 220 is turned on, the contact of the normally-closed contact relay opens and the horn is separated. The process proceeds to step 520. If the set switch is operated by the switch signal data obtained by the flow shown in FIG. 4, the process is passed to the step 540, while if the set switch is not operated, the process proceeds to step 530 (FIG. 4 will be described later). If the resume switch is turned on in the presence of a stored vehicle speed at step 530, the process is passed to step 550; while in the opposite case, the process returns to step 520 for repeating steps 520 and 530. In the case where the process is passed to step 540 with the set switch turned on, the present vehicle speed is stored as a target vehicle speed, followed by step 550 where the flag is processed for starting the control or turning on the release valve 230 thereby to enter the fixed speed control 560. In order to run the vehicle at a fixed target speed, a duty factor for driving the negative pressure actuator is determined by the proportionality computation based on the advance compensation from the difference between the target vehicle speed and the present vehicle speed thereby to drive the control valve 240. The process is then passed to step 570, where it is decided whether or not a cancellation signal is received, and in the absence of the cancellation signal, the process returns to step 560 to repeat the auto drive control, while in the presence of a cancellation signal, the process proceeds to step 580 for cancellation processing, followed by the return to step 520. If the resume operation is performed at step 530, the process is passed to step 550, where the operations similar to those mentioned above are repeated with the stored vehicle speed as a target vehicle speed.

The fetching of the operation signals will be explained below with reference to FIG. 4.

Signals are fetched from the switches 400 by the timer interruption routine at intervals of 5 msec. When an interruption occurs by the overflow of the timer in the microcomputer 140, the routine of FIG. 4 starts. At step 610, the register used is retreated, followed by step 620 for such timer processing as the incrementation of the soft timer, and the process is then passed to the next step. At step 630, the analog signal applied is read as a digital quantity, and by averaging out the particular data and the preceding data (step 640), the present data is obtained. At step 650, the present data is compared with the decision level $C_1$, and if the present data is larger than the level $C_1$, the process is passed to step 670, where it is decided that none of the switches 400 is depressed, thus storing the switch data in the microcomputer 140. The RAM area is cleared to proceed to step 780. If the present data is smaller than the decision level $C_1$, on the other hand, the process proceeds to step 680 where the present data is compared with the decision level $C_2$. If the present data is larger than the decision level $C_2$, the process is passed to step 690, where the flag for the cancellation switch ON is set, followed by step 700, where the other switch flags are cleared to proceed to step 780. If the present data is smaller than the level $C_2$, on the other hand, it is compared with the next decision level $C_3$, and if the present data is larger than the level $C_3$, the process is passed to step 720, where the resume switch on flag is set, followed by step 730 where the other switch flags are reset thereby to proceed to step 780. In the case where the present data is smaller than the level $C_3$, the process proceeds to step 740, where it is compared with the decision level $C_4$. If the present data is larger than the level $C_4$, the process proceeds to step 750, where the set switch on flag is set, followed by step 760 where the other switch flags are reset thereby to proceed to step 780. If the data is smaller than the decision level $C_4$, by contrast, the process is passed to step 770, where it is decided that the horn switch is turned on, and the transistor 220 is turned off thereby to turn on the contact of the relay 30, followed by step 790. At step 780, the transistor 220 is turned on and the contact of the relay 30 is turned off, thereby proceeding to step 790. The step 790 starts the analog-digital conversion of the microcomputer 140 for reading the digital quantity of the input signal by the next timer interruption. The process is then passed to step 800 where the register is restored, followed by the return step at 810.

Figure 5:
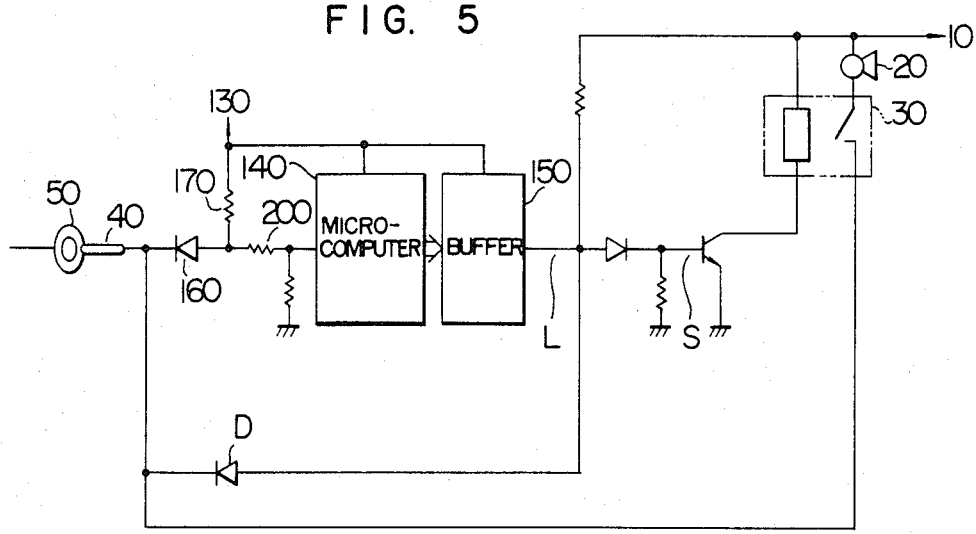
FIG. 5 is a partial electrical circuit diagram showing a third embodiment of the control circuit system according to the present invention.

FIG. 5 shows a partial electrical circuit diagram showing a third embodiment of the present invention.

The relay 30 is normally closed when the transistor of the switching circuit (S) is turned off. This transistor, like in the aforementioned embodiment, is subjected to on-off control by the computer 140 in order to sound and stop the horn 20. The computer 140 includes a multiplicity of parts and is lower in reliability than the conventional horn, so that the switching circuit (S) is adapted to be actuated directly through the diode (D). If required, the signal line may be eliminated for actual application.

By the above-mentioned construction and operation, the signal voltage level based on the switch operation is converted from an analog quantity into a digital quantity, whereby the fixed speed control unit may be controlled.

In the case of a microcomputer without any function of analog-digital conversion, an analog-digital conversion element may be provided outside of the microcomputer to attain the same effect.

According to the present invention, the voltage level on the signal line based on the operation of a switch mounted on the steering handle is subjected to analog-digital conversion, and the particular switch is identified by the digital quantity. Even when a plurality of switches are used, therefore, a single signal line serves the purpose. Also, the averaging operation of the microcomputer eliminates a noise-deadening element.

We claim:

1. A control circuit system for an automobile having a steering handle comprising:

command switch means having a plurality of command switches mounted on said steering handle including a horn switch, for producing a d.c. command signal corresponding respectively to each of said switches;

control circuit means for generating a respective control signal in response to each of said d.c. command signals from said command switch means;

power switch means for selectively rendering operative said control circuit means by supplying a voltage thereto from a battery of said automobile;

a normally-closed relay switch connected between said switch means and an electric horn of said automobile and controlled by said control signal of said control circuit means, said relay switch being connected to be turned on when said power switch means are turned off, and be turned off by said control circuit means when said power switch means are turned on, said relay switch operatively connecting said battery with said command switch means when said relay switch is turned on; and signal coupling means for connecting said switch means and said control circuit means by a single signal line.

2. A control circuit system according to claim 1, wherein said plurality of said command switches are connected in parallel to each other and electrically connected with a cascaded resistor network, whereby the cumulative resistance respectively associated with each of said command switches establishes relative priority among said command switches.

3. A control circuit system according to claim 1, wherein said control circuit means include a plurality of comparators corresponding to said command switches respectively and supplied with command signals from said command switches, and a plurality of logic circuits corresponding to said comparators respectively and supplied with at least one output signal of said comparators.

4. A control circuit system according to claim 1, wherein said signal coupling means includes a diode.

5. A control circuit system according to claim 4, wherein said control circuit means includes a constant-voltage integrated circuit for applying a voltage to said switch means through said diode of said signal coupling means when the relay contact of said normally-closed relay is open.

6. A control circuit system according to claim 1, wherein said control circuit means includes a microcomputer having an analog-digital converter.

7. A control circuit system according to claim 1, wherein said signal coupling means includes a slip ring.

* * * * *